Sept. 9, 1941. J. C. GORDON 2,255,248
SEAT CUSHION AND THE METHOD OF MAKING SAME
Filed May 15, 1939 2 Sheets-Sheet 1

INVENTOR.
JACK C. GORDON
BY
ATTORNEYS

Sept. 9, 1941. J. C. GORDON 2,255,248
SEAT CUSHION AND THE METHOD OF MAKING SAME
Filed May 15, 1939 2 Sheets-Sheet 2
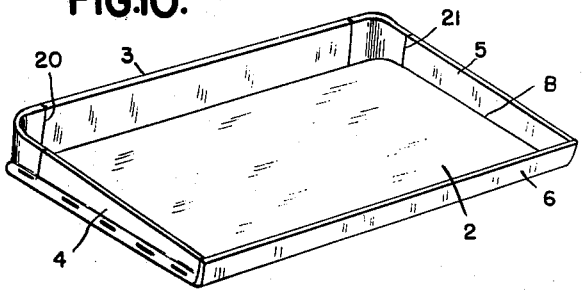
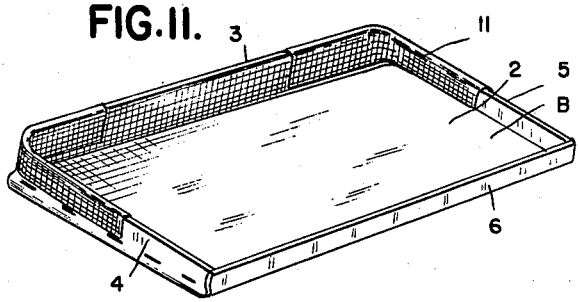
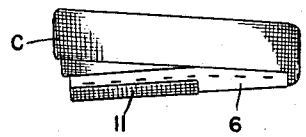
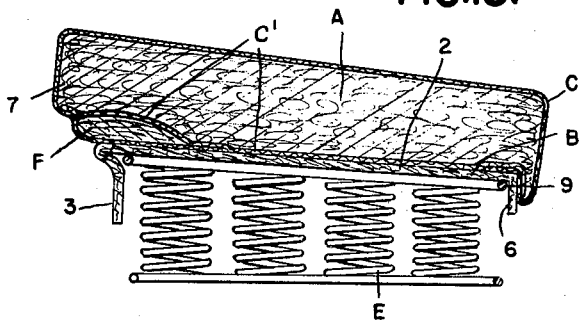
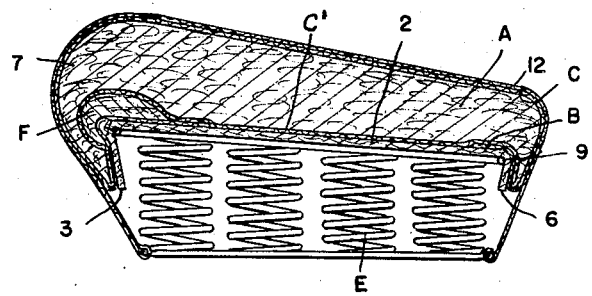
INVENTOR.
JACK C. GORDON
BY
ATTORNEYS Patented Sept. 9, 1941

2,255,248

UNITED STATES PATENT OFFICE 2,255,248

SEAT CUSHION AND THE METHOD OF MAKING SAME

Jack C. Gordon, Detroit, Mich., assignor to Allen Industries, Inc., Detroit, Mich., a corporation of Delaware Application May 15, 1939, Serial No. 273,749

24 Claims. (Cl. 155—184)

This invention relates generally to upholstery units and refers more particularly to motor vehicle seat cushions.

One of the essential objects of the invention is to provide an improved cushion of this type, having greater resiliency and excellent padding qualities, that can be made with greater accuracy, for less money, and that is capable of withstanding abuse due to handling in the trim shop without disintegrating or falling apart as heretofore.

Another object is to provide a cushion that may be made as a self-contained unit in the shape or configuration desired as a substitute for sponge rubber or molded rubber cushions now on the market, without the necessity of using expensive molds and the like, such as those required for making rubber cushions.

Another object is to provide a cushion that is constructed and formed in such a way that the mohair or other trim material for the cushion may be properly applied thereto without encountering bunched, shifted or irregular portions of the body, as heretofore.

Another object is to provide the body of the cushion with a supporting base that serves to prevent portions of the spring structure from working into the fibrous material of the body, and that has certain depending portions that cooperate with each other to pilot or center the cushion upon such spring structure and to prevent lateral displacement.

Another object is to provide a cushion having means adjacent the sitting edge thereof for affording greater resiliency and padding, and for further insulating the rider from the upper border wire of the supporting spring structure.

Other objects, advantages, and novel details of construction will be made more apparent as this description proceeds, especially when considered in connection with the accompanying drawings, wherein:

Figure 10 is a bottom perspective view of the structure shown in Figure 9, after the depending flanges have been formed, and showing them held in predetermined position relative to the base by means of staples.

Figure 11 is a view similar to Figure 10, but showing reinforcing material applied to the depending flanges.

Figure 12 is a side elevation of the parts after the base has been secured to the underside of the body, to form the finished cushion.

Figure 13 is a sectional view through the structure shown in Figure 12, showing the application of the latter to a supporting spring structure, and Figure 14 is a view similar to Figure 13, showing the position of the parts after the mohair or other trim material is applied.

Figure 1:
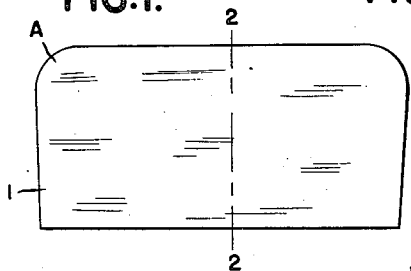
Figure 1 is a plan view of the fibrous body after one surface thereof has been coated with latex.
Figure 3:
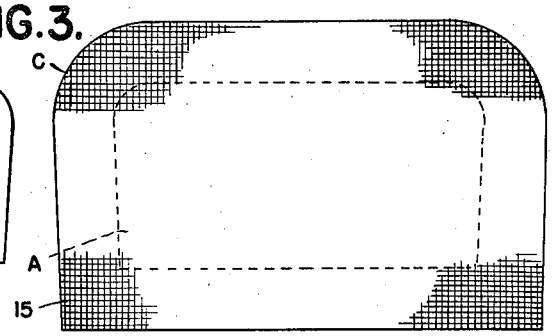
Figure 3 is a plan view of the sheet of tobacco cloth applied to the coated surface of the body.

Referring now to the drawings, A is the body, B is the base, and C is the fabric covering of a self-contained seat cushion embodying my invention.

As shown, the body A is tapered from front to rear and is formed of cotton or other fibrous material of the desired size, shape and thickness so as to be relatively fluffy. Preferably, this body is completely enveloped or covered by a skin coating 1 of latex or the like, which cooperates with such body to provide the desired resilience and cushioning effect.

The base B is preferably formed of jute or the like and constitutes a supporting seat for the body A. In the present instance, this base B has a substantially flat central portion 2, and is provided at the edges of such portion with depending flanges 3, 4, 5 and 6 respectively which collectively form a skirt for enveloping a supporting spring structure such as E. The central portion 2 substantially conforms in shape to the underside of the body, and is adapted to insulate and protect the latter from the supporting spring structure E, when applied thereto as in Figure 13. Preferably, the area of the base B is less than the area of the underside of the body A, so that there is an overhanging strip 7 of the body about the base for a purpose to be later described. Actually this central portion 2 rests upon the upper border wire 9 of the supporting spring structure, while the depending flanges of the base extend downwardly upon the outer sides of the border wire. Thus, the flanges 3, 4, 5 and 6 cooperate with each other to envelope said border wire and in doing so, they serve effectively to pilot or center the cushion upon the spring structure and to prevent lateral displacement.

The flanges 3, 4 and 5 respectively may be formed in sections or may be integral, if desired. Preferably, the flanges 3 and 5 are formed separately from the flange 6, as illustrated in Figure 10. Burlap 11 or other suitable fabric may be used as in Figure 11 to embrace such flanges, to stiffen and reinforce the same whenever it is deemed advantageous and advisable.

The fabric covering C is preferably some open mesh material, such as tobacco cloth. As shown, this cloth completely covers the body A, except for a predetermined area of the underside thereof. Thus, such fabric serves in effect as a protecting envelope for the body, which insures a smooth top surface for engagement by the mohair or other trim material, and effectively prevents the fibers of such body from shifting or bunching up or otherwise being displaced or lost.

Interposed between the body A and base B at the forward or sitting edge of the cushion, is a pad F of cotton or other fibrous material that serves as a reinforcement at this point to afford greater resiliency and padding, and to further insulate the rider from the upper border wire 9 of the spring structure. By referring to Figure 13, it will be noted that this pad F projects slightly outward beyond the base B but terminates short of the overhanging strip 7 of the body. Thus, in effect, a stepped forward edge construction is provided which is adapted to give the proper soft roll for the sitting edge of the cushion when the mohair or other trim material is applied as illustrated in Figure 14.

Figure 2:
Figure 2 is a sectional view taken substantially on the line 2—2 of Figure 1.
Figure 6:
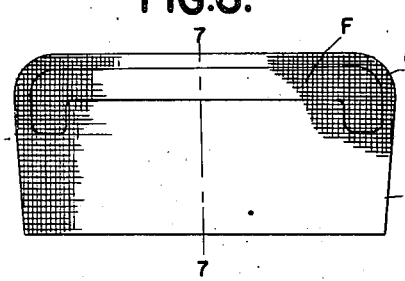
Figure 6 is a bottom plan view of the body and reinforcing pad after the tobacco cloth has been adhered to the latexed side edges, reinforcing pad, and underside of the body.
Figure 4:
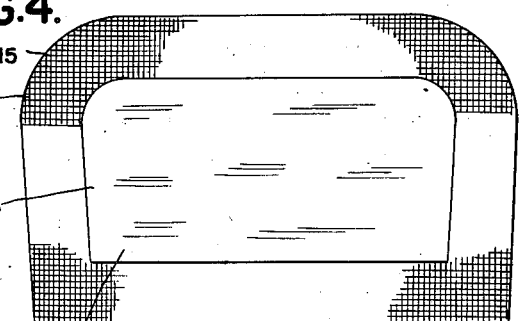
Figure 4 is a view similar to Figure 3, showing the parts upside down and the exposed underside and side edges of the body coated with latex.
Figure 7:
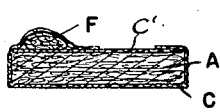
Figure 7 is a sectional view through the structure illustrated in Figure 6.
Figure 5:
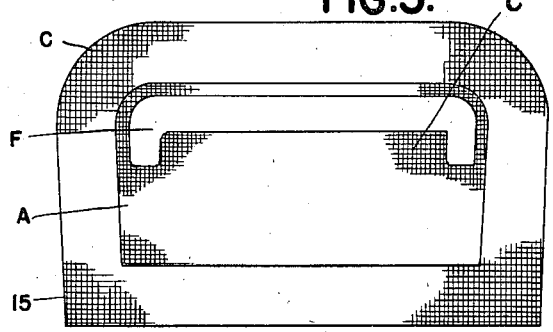
Figure 5 is a plan view of the structure illustrated in Figure 3, showing the reinforcing pad applied to the body.

In the process of construction, the body A of cotton as illustrated in Figure 1, is preferably die cut from a continuous sheet of cotton batting of the desired size and thickness. The upper surface of the body is then sprayed with latex, as illustrated at X in Figure 2. Following this, the central portion of the sheet C of tobacco cloth or the like, is applied to the coated surface. The marginal portions 15 of such tobacco cloth are left free. The assembly is then turned upside down so that the underside and side edges of the body may be sprayed with latex as illustrated in Figure 4. A reinforcing sheet C' of open mesh fabric such as tobacco cloth is then applied to the coated surface 1 of the body and is sprayed with latex. The preformed pad F of cotton or other fibrous material is then applied to the coated reinforced surface adjacent the forward edge of the body, as illustrated in Fig. 5. Latex is then applied preferably by a spraying operation to the exposed portions or surfaces of such pad F. The free marginal portions 15 of the fabric C are then adhered to the coated edges and underside of the body A and pad F, as illustrated in Figures 6 and 7.

Figure 8:
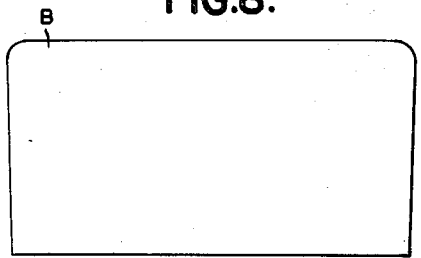
Figure 8 is a plan view of the jute blank cut to size from jute stock in sheet form.
Figure 9:
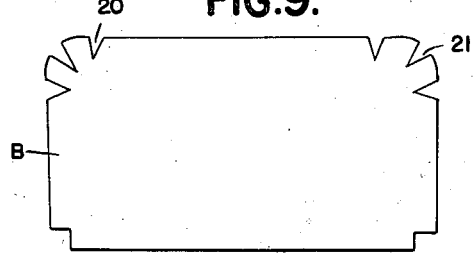
Figure 9 is a view similar to Figure 8 after the blank has been notched to permit the depending flanges to be formed.

The base B is preferably die cut from suitable stock such as jute or the like in sheet form to provide a blank that is initially flat throughout as illustrated in Figure 8. If desired, such jute may be matted by needling or felting operations and may have both surfaces thereof covered with latex as illustrated in Figure 8. In fact the jute may be coated with latex before or after the die cutting operation. Likewise, the jute base may be covered with latex after the flanges 3, 4, 5 and 6 respectively are formed, instead of before, if desired. In either instance, the latex serves to stiffen and reinforce the jute and thus to render it more efficient for insulating the body from the spring structure. The flanges 3, 4 and 5 are preferably formed as an integral strip separate from the flange 6 by cutting or notching the jute blank at 20 and 21 respectively, as illustrated in Figure 9. Following this, the marginal portions of the blank between the cuts 20 and 21 are bent at right angles to the central portion 2 of the sheet to form the flanges 3, 4, 5 and 6 respectively, as illustrated in Figure 10. This may be accomplished in a suitable press (not shown). If desired, such flanges may be stapled or otherwise secured to the central portion 2 of the base as illustrated in Figure 10, and may be further reinforced by burlap 11 or the like, as illustrated in Figure 11. Such burlap may be secured by latex to the flanges or may be stapled, sewed or otherwise secured thereto as desired. The formed base B is then applied to the fabric covered body A by the use of latex or the like. In other words, the central portion 2 of the base is adhesively secured in surface to surface relation to the underside of the body A and pad F, by the application to one or both of such meeting surfaces of latex to provide the finished cushion, illustrated in Figure 12.

Whenever desirable or necessary during the process just described, the latex used may be partially or fully cured by passing the coated materials through a suitable heating chamber (not shown) where currents of hot air may be applied. Preferably the body A is formed on one assembly line while the base B is formed on another assembly line. They are united, cured etc. on a third assembly line.

As an alternative the base B may be die cut from suitable stock in sheet form to provide a blank of the required size. This blank may then be scored adjacent the edges to provide marginal portions that may be bent at right angles to the central portion 2 of the blank to provide the flanges 3, 4, 5 and 6. If desired the die cutting and scoring operations may be accomplished in one operation, and the sizing or coating with latex may be omitted until after such operation.

In use, the central portion 2 of the base rests upon the upper border wire 9 of the supporting spring structure E, while the depending flanges 3, 4, 5 and 6 form an enveloping skirt for said border wire and serve to locate the cushion on said spring structure and to prevent lateral displacement. The mohair 12 or other trim material extends over the cushion as illustrated in Figure 14, and is anchored in any suitable manner to the spring structure E or framework of the vehicle body.

Thus, from the foregoing, it will be apparent that I have provided a seat cushion that possesses great resiliency and padding qualities. The latexing of the materials used, particularly of the fibrous body, is important in this respect. Moreover, being self-contained and protected by the tobacco cloth and base, there is no possibility of the cotton of the body disintegrating or falling apart. Therefore, the cushion can withstand abuse during handling in the trim shop. Such cushion may also be easily and accurately applied to the supporting spring structure, hence skilled labor for the purpose is unnecessary.

What I claim as my invention is:

1. An upholstery unit having a body of fibrous material, a separate base secured to the underside of the body, and a reinforcing pad between the base and body, the base, body and pad having edge portions in stepped relation to facilitate rolling of an edge portion of the body around the adjacent edge portions of the pad and base.

2. An upholstery unit having a body of fibrous material, and a base having a substantially flat central portion secured to the underside of the body and having marginal turned down flanges, and securing means engaging the flanges and flat central portion for holding the flanges in proper turned down relation to the central portion of said base.

3. An upholstery unit having a body of fibrous material, a base having a substantially flat central portion and downturned marginal flanges, and a reinforcing pad between the central portion of the base and the underside of the body, a reinforcing fabric covering the body and pad and the central portion of the base being secured to the covered body and pad.

4. An upholstery unit having a body of fibrous material, an insulating base having a substantially flat portion secured to the underside of the body and having downturned marginal flanges, and reinforcing means for said flanges tending to stiffen and maintain the same in proper depending relation relative to the flat portion of said base.

5. The method of making a seat cushion of the type described including the steps of cutting from cotton batting a body of cotton of predetermined shape, coating said body with latex, adhering a reinforcing fabric to said coating, cutting from sheet stock a substantially flat base, turning down the marginal portions of the base to provide depending flanges, and securing the flat portion of the base to the underside of said body.

6. An automobile seat cushion having a body of fibrous material, an open mesh fabric enclosing said body and reinforcing the same, a supporting base of jute secured to the underside of the reinforced body, the area of the base being less than the area of the underside of the body whereby marginal portions of the body overhang the base, and a reinforcing pad between and secured to the body and base at the forward edges thereof.

7. An automobile seat cushion having a body of fibrous material, an open mesh fabric enclosing said body and reinforcing the same, a supporting base secured to the underside of the reinforced body, the area of the base being less than the area of the underside of the body whereby marginal portions of the body overhang the base, and a reinforcing pad between and secured to the body and base at the forward edges thereof, said pad projecting outward beyond the base but terminating short of the overhanging marginal portion of the body, thereby providing a stepped forward edge adapted to provide a soft roll for the sitting edge of the cushion when trim material is applied thereto.

8. An automobile seat cushion having a base, a body of fibrous material on the base, a reinforcing pad between the base and body at the forward edges thereof, and a fabric covering the body and pad and having portions on the undersides of the body and pad secured in surface-to-surface relation to the base.

9. An automobile seat cushion having a substantially flat base of relatively coarse fibrous material, a relatively thick body of relatively light fibrous material on the base, a skin coating of latex completely enveloping the body, a reinforcing pad between the coated body and base at the forward edges thereof and having a skin coating of latex, and an open mesh fabric covering the body and pad and adhering to the latex coatings thereon, portions of the covering being on the upper side of and bonded to the base.

10. A seat cushion separate from and adapted to be mounted upon a supporting spring structure comprising a self-contained unit having a body of fibrous material, a reinforcing base secured to the underside of said body and being shaped to provide a recess for receiving the upper part of a supporting spring structure, the area of said base being less than the area of the body, and a reenforcing pad between said body and base at the forward edges thereof, said pad projecting laterally beyond the forward edge of the base but terminating short of the forward edge of the body.

11. A seat cushion separate from and adapted to be mounted upon a supporting spring structure, said cushion being a self-contained unit having a body of fibrous material, a pad of fibrous material on the underside of the body at the forward edge thereof, an open mesh fabric covering the body and pad, a skin coating of latex completely enveloping the body and pad and bonding the fabric thereto, and a base of relatively coarse fibrous material on the underside of and secured to the body and pad, said base being adapted to rest upon a spring structure and having depending flanges for overhanging such structure.

12. An upholstery unit of the class described comprising a fluffy unimpregnated body of fibrous material, and uninterrupted adhering resilient skin coating completely enveloping the same, a coated reinforcing sheet adhering to the coated underside of the body, a reinforcing pad adhering to the coated reinforcing sheet adjacent an edge of the body, a fabric sheet adhering in surface-to-surface relation to the top surface and side edges of the body and to the underside of the body and pad, and a supporting base secured to the fabric sheet on the underside of the pad and body and having depending marginal flanges forming a skirt for enveloping a supporting spring structure.

13. An upholstery unit of the class described comprising a fluffy body, two reinforcing fabrics for said body, a supporting base for the body, and a reinforcing pad between the body and base at an edge thereof, the body being a shaped assembly of relatively loose unimpregnated fibrous material, one reinforcing fabric being secured in surface-to-surface relation to the underside of the body, the pad being secured to the reinforced underside of the body, the second reinforcing fabric being disposed in surface-to-surface engagement with the top surface and side edges of the body and secured to the underside of the pad and body, and the base being secured to the underside of the reinforced pad and body.

14. An upholstery unit of the class described comprising a fluffy body, a fabric covering for the body, a supporting base for the body, and a reinforcing pad between the body and base at an edge thereof, the body being a shaped assembly of relatively loose unimpregnated fibrous material, the pad being secured to the underside of the body, the fabric covering being disposed in surface-to-surface engagement with the top surface and side edges of the body and secured to the underside of the pad and body, and the base being secured to the underside of the pad and body.

15. An upholstery unit of the class described comprising a fluffy body of unimpregnated fibrous material, a latex coating completely enveloping the body, a reinforcing pad secured to the coated underside of the body at an edge thereof, a fabric covering secured in surface-to-surface relation to the coated upper surface and side edges of the body and to the underside of the pad and body, and a supporting base for the body secured to the fabric covered underside of the pad and body.

16. An upholstery unit of the class described comprising a fluffy body of unimpregnated fibrous material, a reinforcing pad secured to the underside of the body at an edge thereof, a fabric covering secured in surface-to-surface relation to the upper surface and side edges of the body and to the underside of the pad and body, and a supporting base for the body secured to the underside of the pad and body.

17. The method of making a seat cushion of the type described including the steps of cutting from a layer of fibrous material a body of predetermined shape, coating said body with latex, securing a reinforcing sheet to a coated surface of the body, coating said reinforcing sheet, securing a pad of fibrous material to the coated reinforcing sheet, forming an insulating base, and securing said base to said pad and body.

18. The method of making a seat cushion of the type described including the steps of cutting from a layer of fibrous material a body of predetermined shape, coating said body with latex, securing the central portion of a fabric covering in surface-to-surface relation to the coated upper surface of the body, securing a reinforcing sheet to the coated lower surface of the body, securing a pad of fibrous material to the reinforcing sheet, securing the marginal portions of the fabric covering to the coated side edges of the body and to the underside of the pad and body, forming an insulating base, and securing said base to the pad and body.

19. The method of making a seat cushion of the type described including the steps of cutting from cotton batting a body of cotton of predetermined shape, coating one surface of said body with latex, adhering to the coated surface of the body a sheet of reinforcing fabric, coating the opposite surface and edges of said body with latex, adhering to the last mentioned coated surface of the body a sheet of reinforcing fabric, coating the last mentioned reinforcing fabric, adhering to the coated fabric a preformed pad of fibrous material, coating the exposed portions of said pad, and adhering one portion of the first mentioned fabric to the coated pad and adhering other portions of the first mentioned fabric to the coated edges and underside of the body.

20. The method of making an upholstery unit of the class described, including the steps of forming a shaped layer of unimpregnated fibrous material, coating the upper surface thereof with an adhesive substance, adhering to said coated surface the central portion of a sheet of fabric, coating the lower surface and edges of said layer, adhering to the coated lower surface of the layer a reinforcing sheet, coating said reinforcing sheet, adhering a formed pad to said coated reinforcing sheet at an edge of the layer, coating the exposed surfaces of said pad, adhering the marginal portions of the fabric sheet to coated surfaces of the pad and layer, forming a supporting base for the layer and pad, and securing said base in surface-to-surface relation to the underside of the pad and layer.

21. The method of making an upholstery unit of the class described, including the steps of forming a shaped layer of unimpregnated fibrous material, coating the upper surface thereof with an adhesive substance, adhering to said coated surface the central portion of a sheet of fabric, coating the lower surface and edges of said layer, adhering a reinforcing sheet to the coated lower surface of the layer, coating said reinforcing sheet with an adhesive substance, adhering a formed pad to said coated reinforcing sheet at an edge of the layer, coating the exposed surfaces of said pad, adhering the marginal portions of the fabric sheet to coated surfaces of the pad and reinforcing sheet, forming a supporting base for the layer and pad, coating the base with an adhesive substance, providing the base with marginal flanges, securing said flanges to the base, securing a fabric to the flanges to reinforce the same, and securing the base in surface-to-surface relation to the underside of the pad and reinforced layer.

22. A self-contained seat cushion unit having a fluffy body, an uninterrupted resilient coating for said body, a cushioning pad of fibrous material outside and extending across said body adjacent the forward edge thereof, a reinforcing fabric for the body, and a fabric covering for the body, the body being an assembly of relatively loose unimpregnated fibrous material, the resilient coating conforming to the exterior contour and completely enveloping and tenaciously adhering to the fibrous material on all exterior surfaces and edges of the body, the reinforcing fabric being secured to the underside of the body, the cushioning pad being secured to the reinforcing fabric, and the fabric covering being secured in surface-to-surface relation to the resilient coating on the upper surface and side edges of the body and having portions secured to the underside of the pad and body, and a stiff supporting base for the fabric covered coated body including a substantially flat layer of relatively coarse material on the underside of the cushioning pad and body and secured in surface-to-surface relation to the fabric covering on the underside of said body and pad.

23. A self-contained seat cushion unit having a fluffy body, a reinforcing fabric for the body, a fabric covering for the body, a stiff supporting base for the body, and a cushioning pad of fibrous material between the body and base at the forward edge of the latter, the body being an assembly of relatively loose unimpregnated fibrous material, the reinforcing fabric being secured to the underside of the body, the fabric covering being secured in surface-to-surface relation to the upper surface and side edges of the body and having portions secured to the underside of the pad and body, and the base being a substantially flat matted layer on the underside of the pad and body and secured in surface-to-surface relation to the fabric covering aforesaid.

24. A self-contained seat cushion unit having a fluffy body, a reinforcing fabric for the body, a fabric covering for the body, a stiff supporting base for the body, and a cushioning pad between and extending across said body and base at the forward edges thereof, the reinforcing fabric being between and secured to the body and pad, and the fabric covering being secured in surface-to-surface relation to the upper surface and side edges of the body and having portions between and secured to the pad and base and the body and base.

JACK C. GORDON.